April 7, 1964 TOSHIO SHINADA ETAL 3,128,397

FORK-SHAPED QUARTZ OSCILLATOR FOR AUDIBLE FREQUENCY

Filed June 14, 1961 2 Sheets-Sheet 1

INVENTORS:
TOSHIO SHINADA
SUSUMU OINUMA
By N. Leek
ATTORNEY

April 7, 1964 TOSHIO SHINADA ETAL 3,128,397

FORK-SHAPED QUARTZ OSCILLATOR FOR AUDIBLE FREQUENCY

Filed June 14, 1961 2 Sheets-Sheet 2

INVENTORS:
TOSHIO SHINADA
SUSUMO OINUMA
By [signature]
ATTORNEY 3,128,397
Patented Apr. 7, 1964

3,128,397

FORK-SHAPED QUARTZ OSCILLATOR FOR AUDIBLE FREQUENCY

Toshio Shinada and Susumu Oinuma, Tokyo, Japan, assignors to Kabushiki Kaisha Kinsekisha Kenkyujo, Tokyo, Japan, a corporation of Japan Filed June 14, 1961, Ser. No. 117,030
Claims priority, application Japan June 21, 1960
2 Claims. (Cl. 310—9.5)

This invention relates to improvements in a quartz oscillator which is cut from a quartz blank and processed and formed into the shape of a fork, and is characterized in that it has been made to oscillate in a specific azimuth and a specific oscillating direction.

It is an object of the invention to provide a fork-shaped quartz oscillator for audible frequencies that possess excellent characteristics such as zero temperature coefficient at about room temperature.

It is known that a quartz oscillator can be made to oscillate by arranging upon it electrodes most suitable for its mode of oscillation and by applying piezoelectricity. The principal reason that quartz oscillators are in wide use in the field of telecommunications as compared with oscillators of other materials that are piezoelectric or strongly dielectric is because of its elasticity and particularly because its value of Q is higher and its loss is small. However, quartz oscillators are most generally of short wave and long and medium wave bands, and while that using the bending of a rod-shaped quartz is widely used as a mode of oscillations suitable for the low frequency range, even then its frequency is restricted to the extent of several kilocycles per second. Namely, it is difficult to obtain mother crystals that are large and of good quality from natural quartz. And even if it were possible to obtain a large mother crystal, owing to its exceedingly high price and the fact that the quartz oscillator would become large in size as to run counter to the recent general tendency to decrease the size of electronic parts, from the practical standpoint there would be difficulty. We have found that by bending the points of node of oscillation and forming into a fork shape it is possible to produce an oscillator whose frequency band ranges even as low as several hundred cycles despite the smallness of its over-all size.

Figure 1A:
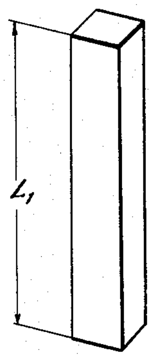
Figure 1B:
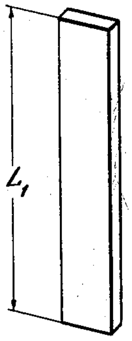
Figure 2A:
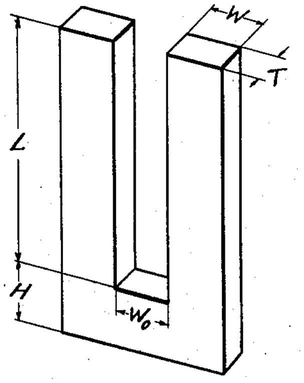

FIGS. 1A, 1B and 2A of the accompanying drawings are the perspective views showing the shapes of the known quartz plates for oscillators as hereinabove described. In order to obtain in a fork-shaped quartz oscillator a frequency equivalent to that obtained in a conventional rod-shaped quartz oscillator having a length $L_1$, the length L of the oscillating part of the fork-shaped quartz oscillator need be only about 40% of the length $L_1$ of the rod-shaped quartz oscillator.

Figure 2B:
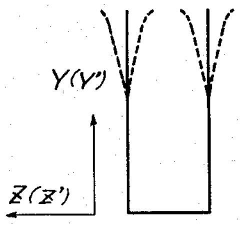
Figure 3B:
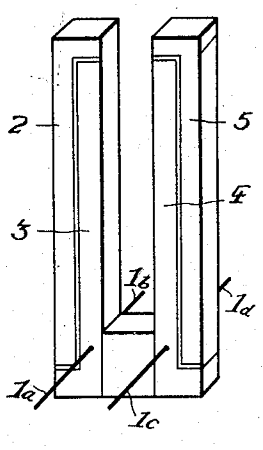
Figure 3C:
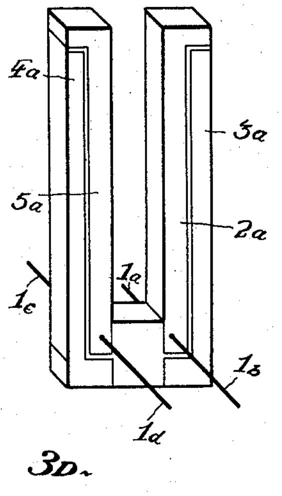
Figure 3A:
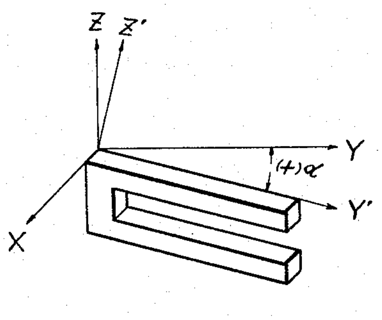
Figure 3D:
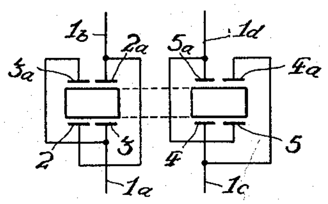

FIG. 2B illustrates the mode of oscillation and direction of the axis of the fork-shaped quartz oscillator shown in FIG. 2A. FIG. 3A shows an example of the direction of cut of a fork-shaped oscillator with respect to the crystal axes X, Y, and Z of a mother crystal, the principal face of the fork being in the plane including the Y—Z axes and the direction along its length Y′ is inclined $+\alpha$ (as shown in the drawing) or $-\alpha$. FIGS. 3B and 3C are perspective views as seen from both sides of a fork-shaped oscillator showing an arrangement of the electrodes for excitation of the oscillator. FIG. 3D is a circuit diagram showing the connections between the electrodes, and in which is shown the oscillator being supported at the points of node of oscillation by means of supports 1_a_, 1_b_, 1_c_, and 1_d_ which also serve as the lead wires of the electrodes. On both front and back surfaces of the oscillating parts there are provided in pairs and insulated from said other electrodes 2, 3 and 2_a_, 3_a_; and 4, 5 and 2 and 3, 2_a_ and 3_a_, 4 and 5, and 4_a_ and 5_a_. Each of these electrodes forms a metal coating that has been deposited on the quartz oscillator's surfaces by means of spattering or vacuum evaporation in vacuo. And as shown in FIG. 3D the outside electrode 2 on one of its surfaces is connected with the inside electrode 2_a_ on the opposite surface, and the inside electrode 3 on one of the surfaces is connected with the outside electrode 3_a_ on the opposite surface. In like fashion the electrodes 4 and 4_a_, and 5 and 5_a_ are connected with each other. Then between these four pairs of facing electrodes with the lead wires 1_a_, 1_b_, 1_c_, and 1_d_ intervening an alternating electric potential is impressed.

Figures 3E, 4, 5, 6A, 6B, 7, 8, 9:
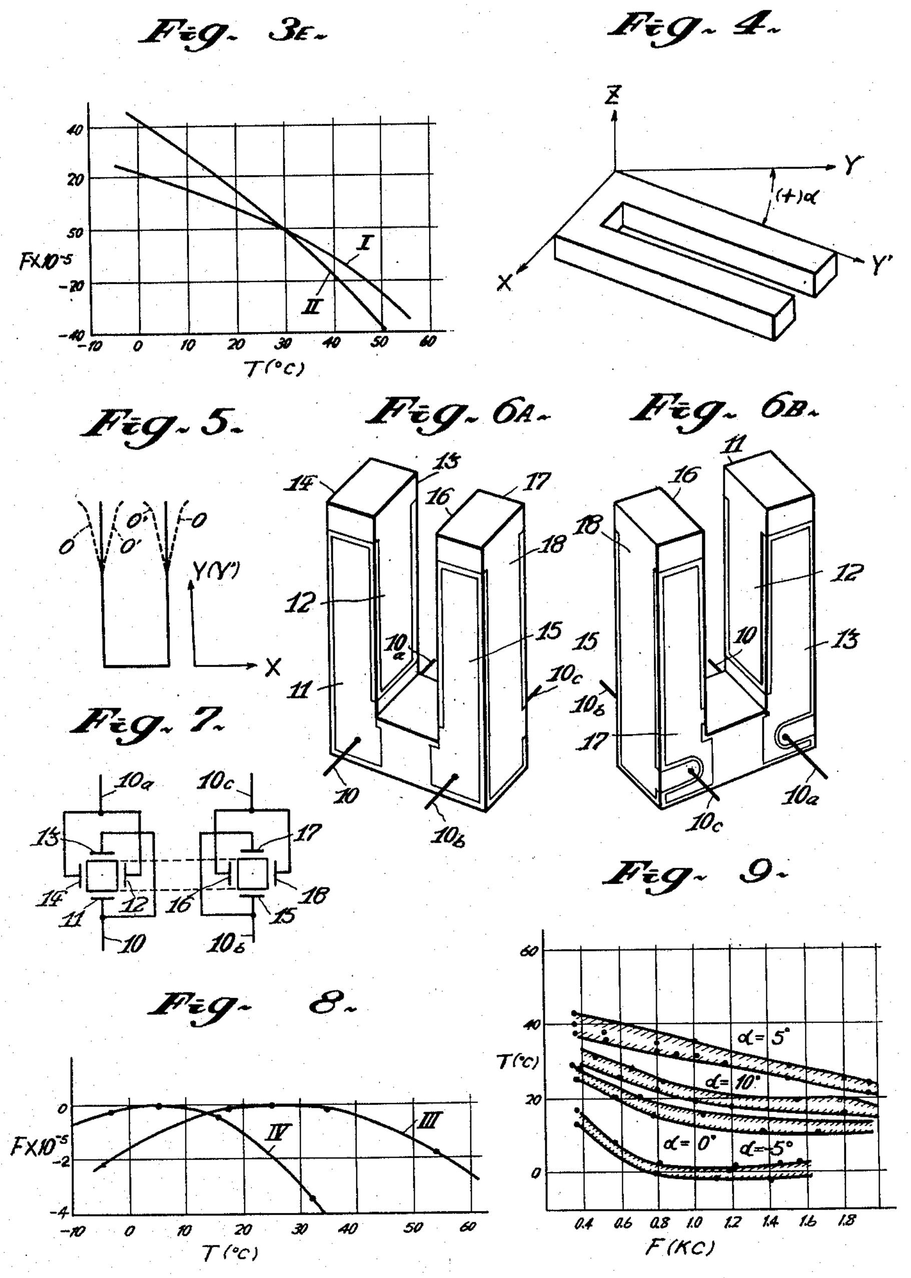

Thus, since there occurs a phase difference of about 180° in the impressed alternating electric potential between each of the pairs of electrodes 2 and 3_a_, 3 and 2_a_, 4 and 5_a_, and 5 and 4_a_ whereby the quartz oscillator is oscillated, the oscillations of the oscillator are present in the Y—Z plane as shown in FIGS. 2B and 3A. In FIG. 3E are shown the characteristic curves experimentally obtained showing the frequency deviations with respect to temperature changes for two examples (I, II) of fork-shaped oscillators corresponding to the type shown in FIGURES 3A, 3B, 3C, and 3D. In these examples, with reference being made to FIG. 2A, the dimensions are as follows: The height of the base of the fork H is 4.7 mm., the length of the pair of rod-shaped oscillating parts L, 47 mm., the width W of the prongs as well as that part therebetween $W_0$, 2.4 mm. and the thickness $t$, 0.8 mm., the azimuth of cut from the quartz blank, as shown in FIG. 3A, being either the case where $\alpha$ is $-5°$ or $+5°$. And in FIG. 3E the curve I is the case when the frequency was 907.3 cycles and curve II, 943.2 cycles, the temperature T° C., being indicated on the axis of abscissa and the frequency deviations at 30° C. being indicated on the axis of ordinate in units of one hundred-thousandth centering around the aforementioned frequencies.

In this type of quartz oscillator, since the oscillations are present in the Y—Z plane, it is almost impossible to obtain a quartz oscillator having a temperature coefficient of zero at around room temperature even though the ratio of its width W to length L or its azimuth of cut $\alpha$, is changed.

However, according to the present invention by a construction that is described hereinafter a fork-shaped quartz oscillator having the characteristics of zero temperature coefficient is provided.

By means of a perspective view of a fork-shaped oscillator of the present invention FIG. 4 shows the azimuth of cut with respect to the crystal axis. FIG. 5 is a view explaining its mode of oscillation. FIGS. 6A and 6B are perspective views showing the arrangement of the electrodes as viewed from the front and back sides. FIG. 7 is a diagram of the circuits showing the electrode connections. FIG. 8 is a graph of the experimental results showing the frequency deviations with respect to temperature change of two examples of fork-shaped quartz oscillators of the present invention (Examples III, IV) corresponding to the type shown in FIGURES 4, 6A, 6B and 7. FIG. 9 is a graph showing the relation between the peak temperature at which the temperature characteristics provide a zero temperature coefficient and the frequency at that time that is attributable to the value of the azimuth of cut $\alpha$. This quartz oscillator is, as shown in FIG. 4, so constituted that the principal face of the quartz oscillator is present within a plane rotated a given angle $\alpha$ from a plane of a mother crystal including an X-axis and a Y-axis, with the X-axis as the pivot.

As shown in FIGS. 6 and 7, to the four sides of each of the two longitudinal parallel parts of oscillation are arranged respectively four electrodes. And an electrode 11 on the front of one of the parts of oscillation is connected electrically to an electrode 13 on its opposite side; then an electrode 12 on the inner side is connected similarly with an electrode 14 on the outer side. Similarly with the other oscillation part, electrodes 15 and 17, and electrodes 16 and 18 are connected to each other. Then by means of the electric circuit shown in FIG. 7 an alternating electric potential from 10, 10*a*, 10*b*, and 10*c* is impressed among each electrode.

The direction of the oscillation that is set up by the quartz oscillator of the invention described hereinabove is included within the X—Y plane shown in FIGS. 4 and 5, and its mode of oscillation is as shown by the broken lines O, O′ of FIG. 5. By varying the azimuth of cut $\alpha$ of the crystal that is shown in FIG. 4 the plane of oscillation can be changed.

In FIG. 8 is shown the temperature characteristics experimentally obtained of the frequency of the quartz oscillator of the examples of the present invention. The curve III was that of a 796.6 cycle oscillator whose $\alpha=+5°$ and whose dimensions were with reference to FIGS. 6A and 6B as follows: the height of the base, 5 mm.; the length of the oscillating parts, 46.27 mm.; and the width of these parts as well as that part therebetween and the thickness, 2 mm. On the other hand, the curve IV was that of a 1505.6 cycle oscillator whose $\alpha=-5°$ and whose dimensions were: the height of the base, 5 mm.; the length of the oscillating parts, 33.6 mm.; and the width of these parts as well as that part therebetween and the thickness, 2 mm.

In the case of this type of oscillator, we found by experiment that if a selection is made such that the $\alpha$ comes within the range of $-5°$ to $+10°$ and the ratio of the width W of each of the parallel oscillating parts to their length L ranges between 0.02 to 0.07 and application is made within the range of 400 cycles to 3000 cycles, secondary curves which are practically identical are described, and further that the peak temperatures, indicated in FIG. 8 at which these temperature characteristics provide zero temperature coefficient change as shown in FIG. 9. In FIG. 9 on the axis of abscissa is indicated the kilocycles per second and on the axis of ordinate, the temperature (° C.) at which the zero temperature coefficient is provided. In those cases when the $\alpha$ becomes above $+12°$ or below $-8°$, due to union with other oscillations characteristics tending to become intermittent or pulsative are shown, and the resistance to electric resonance also becomes great. As a result the characteristics become unsatisfactory.

As described hereinbefore oscillations of several hundred cycles are readily obtained by the quartz oscillators of the present invention. In addition by selecting the azimuth of cut ($\alpha$) as shown in FIG. 4 and arranging the electrodes as in FIGS. 6 and 7 the oscillators of the present invention possess the characteristic and effect that the frequency deviation can be maintained at less than $\pm 1.5 \times 10^{-5}$ at a temperature ranging around $\pm 30°$ C.

Having thus described the invention, what is claimed is:

1. A fork-shaped quartz oscillator for audible frequency comprising an oblong slab having in its lengthwise direction an incision of a prescribed width in the central part thereof characterized in that the azimuth of cut ($\alpha$) of the plane X—Y′ defined by the principal face the oscillator crystal with respect to the plane X—Y of a mother crystal having crystal axes X, Y, and Z with the X axis as a pivot is in the range of $-5°$ to $+10°$, and the size is such that the ratio of the width W of each of the legs, which are the oscillation parts, to its length L is from 0.02 to 0.09.

2. A fork-shaped quartz oscillator for audible frequency comprising an oblong slab having in its lengthwise direction an incision of a prescribed width in the central part thereof and for providing an alternating electric current necessary to oscillate said oscillator electrodes arranged on the four surfaces of each side leg constituting the oscillation part, each pair of said electrodes opposite each other being connected with each other so that an alternating electric current from a power source may be impressed thereto, characterized in that the azimuth of cut $\alpha$ of the plane X—Y′ defined by the principal face the oscillator crystal with respect to the plane X—Y of a mother crystal having crystal axes X, Y and Z with the X axis as a pivot is in the range of $-5°$ to $+10°$, and the size is such that the ratio of the width W of each of said legs to its length L is 0.02–0.09.

References Cited in the file of this patent

The Quartz Tuning Fork, Wireless Engineer, vol. 30, #7, pp. 161–163, July 1953.